April 16, 1968 R. D. NOLAND 3,377,780
SELF-CLEANING FILTER APPARATUS
Filed Aug. 4, 1966 2 Sheets-Sheet 1

INVENTOR.
Richard D. Noland
BY
Fishburn & Gold
ATTORNEYS

April 16, 1968 R. D. NOLAND 3,377,780
SELF-CLEANING FILTER APPARATUS
Filed Aug. 4, 1966 2 Sheets-Sheet 2

INVENTOR.
Richard D. Noland
BY
Fishburn & Gold
ATTORNEYS

United States Patent Office 3,377,780
Patented Apr. 16, 1968

3,377,780
SELF-CLEANING FILTER APPARATUS
Richard D. Noland, Overland Park, Kans., assignor to W. C. Wiedenmann & Son, Inc., Kansas City, Mo., a corporation of Missouri
Filed Aug. 4, 1966, Ser. No. 570,230
5 Claims. (Cl. 55—294)

ABSTRACT OF THE DISCLOSURE

Simple, compact self-cleaning filter apparatus adapted for mounting on grain dryers includes a structural ring containing an elongated slot forming hollow are continuously driven on a radius over the surface of a fine filter screen supported on a rigid support screen and through which a vacuum is drawn for removing dust and other particles from the flow facing surface of the fine filter screen.

This invention relates to filters and more particularly, to screen type air separators.

Many types of equipment, particularly grain dryers, have a substantial flow of air which is exhausted to the atmosphere and which contains entrained dust or other small particles. It is highly desirable and often in recent times mandatory that these particles be prevented from contaminating the atmosphere or terrain surrounding the installation. The use of a screen in the exhausting air stream of selected mesh is normally sufficient to entrap such particles without producing excessive back pressure; however, the screen must be cleaned at regular intervals to prevent clogging. Although the use of pressurized or vacuum sweeping arms to dislodge particles caught by such screens have been suggested, such apparatus heretofore has been quite complex and in many instances, unreliable.

The principal objects of the present invention are: to provide a simple and effective screen cleaning and air filtering device; to provide a high volume air flow particle separator which is continuously self-cleaning; to provide such apparatus which is easily installed in new or existing installations; to provide such apparatus wherein easy access is provided for changing filter screens; and to provide such apparatus which may be conveniently used in multiple units for installations exceeding the capacity of a single unit.

Other objects and advantages of this invention will become apparent from the following description taken in connection with the accompanying drawings wherein are set forth by way of illustration and example certain embodiments of this invention.

FIG. 4 is a cross-sectional view through the apparatus taken on an enlarged scale particularly showing the relationship between the sweep arm suction nozzle and the filter screen.

Figure 1:
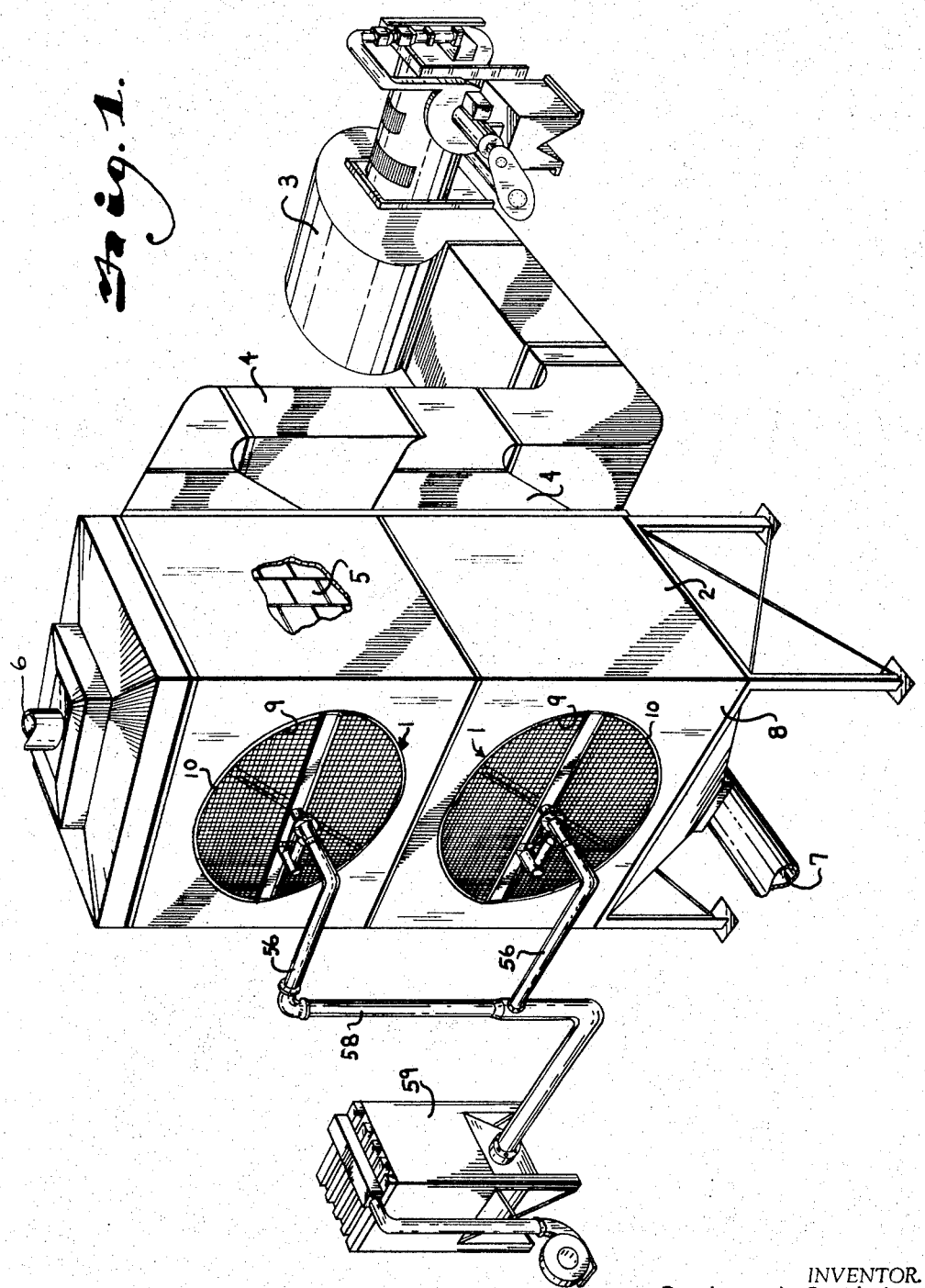
FIG. 1 is a perspective view showing a conventional grain dryer with a pair of air filter devices embodying this invention mounted in the exhaust stream thereof.
Figure 2:
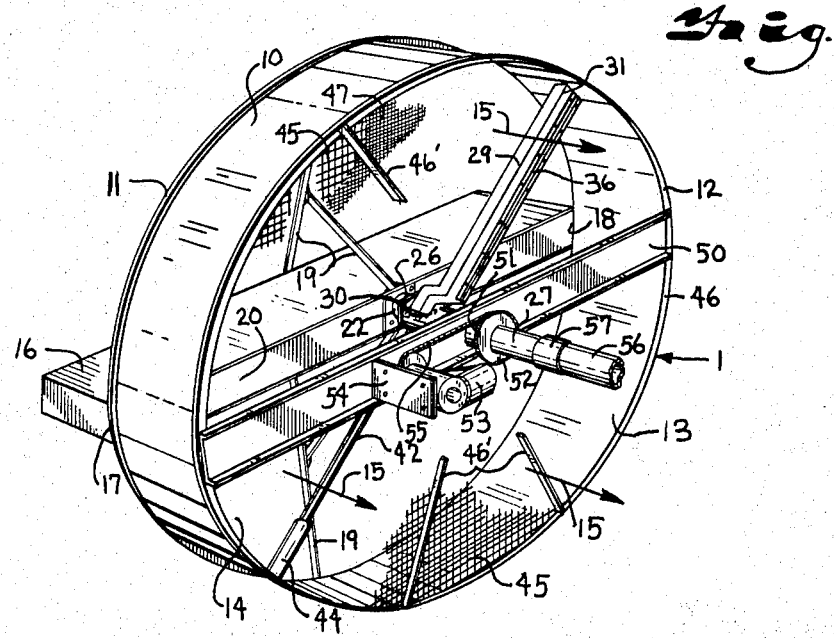
FIG. 2 is a perspective view of a filter apparatus embodying this invention shown separated from the grain dryer with portions of the filtering and supporting screen broken away to show details of interior construction.

Referring to the drawings in more detail:

The reference numeral 1 generally indicates a self-cleaning filter apparatus embodying this invention. The apparatus 1 is illustrated in FIG. 1 in combination with an air flow grain dryer 2 having conventional air heating and blowing equipment 3 directing air by means of ducts 4 through retainers 5 through which grain, either in batch or continuously, is dried. In this example, the grain enters through a suitable inlet 6 and exits in a dry condition at 7. While drying, the air passing through the grain entrains many particles of dust size as well as larger but thin "bee's wings" which flake off certain grains during the drying process. Such particles in the air stream heretofore were commonly exhausted to the atmosphere.

In accordance with this invention, however, the grain dryer 2 is provided with a housing 8 forming air discharge ports 9. Filter apparatus embodying this invention are shown mounted on the housing 8 and located in the discharge ports 9 and all the discharged air is directed therethrough as described below.

The apparatus 1 comprises a structural ring 10 suitably secured to the housing 8 and having a rear flange 11 and a forward flange 12 and a cylindrical web 13 therebetween. The web 13 defines a passageway 14 for the discharged air which exhausts therethrough in the direction indicated by the arrows 15. An elongated box beam 16 extends across the ring 10 and is suitably secured at opposite ends 17 and 18 thereof to the ring adjacent the rear flange 11. Supporting struts 19 extend transversely from the central portion of the beam 16 to the rear flange 11 to increase the structural integrity of the apparatus. The box beam 16 has a front wall 20 and a rear wall 21, which walls are spaced apart axially of the ring 10 and respectively intersect the axis of the ring 10. Front and rear shaft bearings 22 and 23 are respectively mounted on the front and rear walls 20 and 21 and are aligned on the axis of the ring 10.

Figure 3:
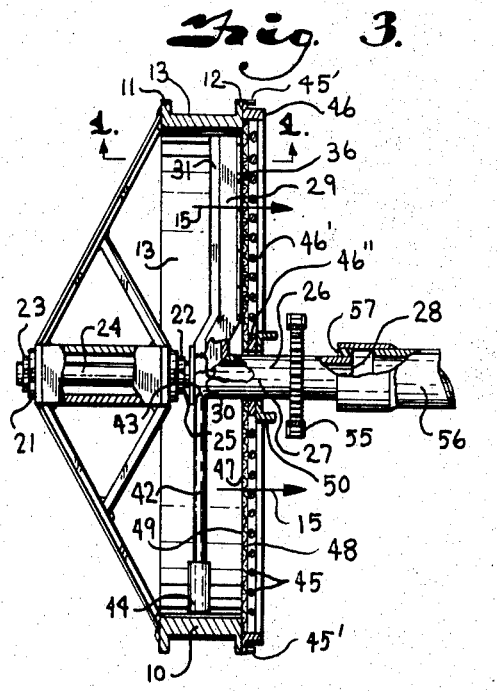
FIG. 3 is a cross-sectional side elevation through the filter apparatus showing further details of construction.
Figure 1:
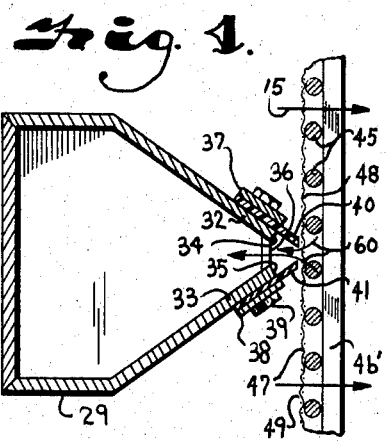

A shaft 24 extends through the box beam 16 and engages the respective bearings 22 and 23 for axial support and free rotation coaxially of the ring. The shaft 24 has a free end 25 extending forwardly into the ring as best illustrated in FIG. 3. A rigid tube 26 is secured to the shaft end 25 and extends coaxially forwardly of the shaft. The rigid tube 26 has a portion 27 extending forwardly beyond the ring 10 and terminating in an open end 28, FIG. 3. A rigid hollow arm 29 is secured to and communicates into the tube 26 at 30 and extends radially outwardly of the tube 26, terminating in a closed outer end 31 located adjacent the web 13 near the forward flange 12. The arm 29 has a pair of parallel generally radially extending lips 32 and 33 respectively terminating in forwardly positioned edges 34 and 35 located just rearwardly of the plane containing the forward flange 12. The lip edges 34 and 35 are laterally spaced apart forming an elongated slot 36 therebetween which rotatably traverses the plane encompassed by the forward flange as the shaft 24 rotates in the bearings 22 and 23. Suitable elongated mounting bars 37 and 38 are secured to the respective lips 32 and 33 by means of screws 39 spaced therealong. The bars 37 and 38 are used to secure relatively flexible elongated strips 40 and 41 which extend forwardly slightly beyond the edges 34 and 35 to permit the effective adjustment of the slot position as well as supplying a less abrasive material for running adjacent or in light contact with the filter screen described below.

An elongated counterweight member 42 is secured at one end 43 thereof to the tube 26 and extends radially therefrom oppositely to the hollow arm 29, terminating at the other end 44 thereof within the ring 10. The counterweight member 42 provides suitable counterweighting structure for the hollow arm 29 whereby rotation of the shaft 24 is balanced.

A rigid circular support screen 45 is mounted in semicircular disks by screws 45' extending through peripheral angles 46 and engaging the forward flange 12. The screen 45 extends forwardly adjacent the plane of the flange across the passageway 14. The screen 45 is rigidly maintained in fixed position axially of the ring 10, both through its own stiffness and with the help of rigid radial struts 46' which radiate thereon from a collar 46". A fine filter screen 47, for example, 20 to 50 mesh, preferably of stainless steel, is positioned in semicircular sections between the slot 36 and the support screen 45 with peripheral edges retained between the flange 12 and angles 46. The filter screen 47 is retained against forward movement under pressure of the discharge air flow by means of contact at the outer surface 48 thereof with the support screen 45. The inner surface 49 of the filter screen 47 is exposed to and located closely adjacent or touching the strips 40 and 41 whereby substantially the entire surface 49 is swept as the hollow arm 29 rotates with the support shaft 24.

An elongated structural channel 50 is secured at opposite ends thereof to the ring 10 adjacent the forward flange 12 and just forwardly of the screens and bisects the passageway 14. The channel 50 has a central opening 51 therethrough through which the rigid tube 26 extends.

A sprocket gear 52 is fixed to the rigid tube 26 forwardly of the channel 50. A prime mover, in this example, a gear motor 53, is mounted on the channel 50 adjacent the rigid tube 26 by means of a suitable bracket 54. A drive chain 55 engages the sprocket gear 52 and gear motor 53 for rotating the tube 26 and thereby sweeping the arm 29 over the filter screen rear surface 49.

A stationary suction conduit 56 terminates at one end thereof adjacent and communicating with the rigid tube 26 at the open end 28 thereof. A rotary seal 57 is engaged between the suction conduit and the rigid tube permitting the tube to rotate with respect to the suction conduit while maintaining a seal therebetween. The suction conduit 56 connects into a suitable manifold 58 which forms the input of a suction dust filter 59, for example, of the type disclosed in the U.S. Patent Application No. 508,986.

In operation, the dust filter 59 draws air thereinto forming a vacuum in the manifold 58 and the respective suction conduit 56. This suction or vacuum is transferred through the rigid tube 26 to the arm 29 where it causes a high velocity air flow into the arm 29 through the slot 36. Due to the proximity of the slot 36 to the filter screen 47, air is drawn locally at high velocity through the filter screen 47 in a direction indicated by the arrows 60, which is reversed from exhausting flow. The particles thereby dislodged from the inner surface 49 are drawn into arm 29 from which they are drawn through the path above noted into the dust filter 59 for disposal. During the suction operation, the gear motor 53 is actuated to cause the arm 29 to slowly sweep about the axis of the ring 10, thus periodically drawing air through the entire filter screen 47, however, in small continuously changing increments. The filter screen cleaning action takes place simultaneously with the discharging or exhausting of air through the ring 10, which air is being filtered as it passes through the filter screen 47. Since only a very small area of the filter screen 47 has reverse flow therethrough at any one instant, there is no appreciable interference with the regular flow of discharged air from the grain dryer and the filter screen is continuously kept clean and operating at high efficiency.

Although one form of this invention has been illustrated and described, it is not to be limited thereto except insofar as much limitations are included in the following claims.

What I claim and desire to secure by Letters Patent is:

1. A self-cleaning filter apparatus adapted for use in a grain dryer to filter out particles produced in said grain dryer, said grain dryer including a grain receiving housing having a discharge port and means producing a stream of drying fluid passing through the grain and out said port, said filter apparatus comprising:
   (a) a rigid planar support screen, structural means supporting said support screen on said housing and covering said discharge port, said support screen having a flow facing surface;
   (b) a fine filter screen positioned against and supported by said support screen surface, said fine filter screen having a flow facing surface;
   (c) a vacuum source, a rigid hollow tube communicating with said vacuum source and extending through said screens, means rotatably mounting said tube on said structural means for axial rotation within said discharge port and longitudinally of said stream;
   (d) an elongate rigid hollow arm secured to and communicating into said rigid tube and extending radially therefrom, said arm having a pair of generally radially directed laterally spaced-apart lips forming an elongate slot extending longitudinally along said arm adjacent said fine filter screen surface; and
   (e) prime mover means supported on said structural means and operatively connected with said tube for rotating said hollow arm, whereby trapped particles are removed from said last named surface.

2. The self-cleaning filter apparatus as set forth in claim 1 wherein said hollow arm includes:
   (a) a mounting bar associated with each of said lips and extending therealong, and
   (b) a relatively flexible strip mounted between each mounting bar and lip, said flexible strips projecting from said arm into light engagement with said fine filter screen flow facing surface.

3. A self-cleaning filter apparatus adapted for filtering out particles produced in a grain dryer having a grain receiving housing wherein grain moves in a path, said grain dryer having means producing a stream of drying fluid passing through the grain and out a discharge port in the housing, said apparatus comprising:
   (a) a structural ring adapted to engage said housing and surround said discharge port; said ring having spaced-apart forward and rear mounting portions;
   (b) a fine filter screen having a flow facing surface, means supporting said screen on said forward mounting portion and extending across said ring;
   (c) a vacuum source;
   (d) a rigid hollow tube positioned axially of and at least partially within said ring and communicating with said vacuum source;
   (e) an elongate hollow arm secured to and communicating into said hollow tube and extending radially thereof at least partially within said ring, said arm having an elongate slot extending longitudinally along said arm and positioned adjacent said screen surface;
   (f) a beam extending across and secured to said structural ring at said rear mounting portion;
   (g) bearing means rotatably mounted on said beam and providing rotating cantilever support for said hollow tube and said arm; and
   (h) means associated with said apparatus for rotating said hollow tube.

4. The self-cleaning filter apparatus as set forth in claim 3 including:
   (a) an elongate structural member having opposite ends secured to said forward mounting portion and extending across said ring; and wherein
   (b) said hollow tube rotating means is supported on said structural member.

5. The self-cleaning filter apparatus as set forth in claim 3 wherein said beam includes:
   (a) a front wall and a rear wall spaced-apart axially of said ring and respectively intersecting the axis of said ring,
   (b) axially aligned bearings respectively mounted on said front wall and said rear wall, and
   (c) axial support means projecting from said tube and engaging said bearings for rotatably supporting said tube.

(References on following page)

References Cited

UNITED STATES PATENTS

| | | | |
|---|---|---|---|
| 1,860,697 | 5/1932 | Traviss | 55—404 X |
| 2,259,221 | 10/1941 | Darby et al. | 210—528 X |
| 2,591,198 | 4/1952 | Ringe | 55—294 |
| 2,601,704 | 7/1952 | Streun | 55—294 |
| 2,609,064 | 9/1952 | King | 55—296 |
| 2,678,109 | 5/1954 | Vedder | 55—294 |
| 2,689,019 | 9/1954 | Roberts et al. | 55—120 X |
| 2,732,912 | 1/1956 | Young | 55—293 X |
| 2,765,048 | 10/1956 | Hersey | 55—294 |
| 2,776,024 | 1/1957 | Fowler | 55—294 |
| 3,019,906 | 2/1962 | Allen | 210—528 X |
| 3,045,409 | 7/1962 | Kronstad | 55—302 X |
| 3,155,473 | 11/1964 | McNeil | 55—294 |
| 3,183,647 | 5/1965 | Lang | 55—294 X |

FOREIGN PATENTS

| | | |
|---|---|---|
| 136,362 | 7/1952 | Sweden. |

FRANK W. LUTTER, *Primary Examiner.*

HARRY B. THORNTON, *Examiner.*

S. W. SOKOLOFF, *Assistant Examiner.*